United States Patent
Ritchie et al.

(10) Patent No.: US 6,647,822 B2
(45) Date of Patent: Nov. 18, 2003

(54) VEHICLE SHIFTER

(75) Inventors: Norman E. Ritchie, Portland, OR (US); Sorin Anghelus, Beaverton, OR (US)

(73) Assignee: Freightliner LLC, Portland, OR (US)

( * ) Notice: Subject to any disclaimer, the term of this patent is extended or adjusted under 35 U.S.C. 154(b) by 33 days.

(21) Appl. No.: 09/793,204

(22) Filed: Feb. 23, 2001

(65) Prior Publication Data

US 2001/0022111 A1 Sep. 20, 2001

Related U.S. Application Data

(60) Provisional application No. 60/184,486, filed on Feb. 23, 2000.

(51) Int. Cl.[7] .................................................. B62D 1/18
(52) U.S. Cl. .............................. 74/473.31; 74/473.32; 74/493
(58) Field of Search ...................... 74/473.3, 473.31, 74/473.32, 493; 280/775

(56) References Cited

U.S. PATENT DOCUMENTS

| | | | | |
|---|---|---|---|---|
| 3,386,309 A | * | 6/1968 | Reed et al. | .................... 74/493 |
| 3,596,531 A | * | 8/1971 | Grosseau | .................. 74/473.32 |
| 4,762,015 A | * | 8/1988 | Katayama | .................... 280/775 |
| 6,327,928 B1 | * | 12/2001 | Bowerman et al. | ...... 74/473.15 |

FOREIGN PATENT DOCUMENTS

| | | | |
|---|---|---|---|
| JP | 6-278490 | * | 10/1994 |
| JP | 10-86693 | * | 4/1998 |
| JP | 2002-46495 | * | 2/2002 |

OTHER PUBLICATIONS

"2002 Explorer/Mountaineer", *Design News Automotive*, (Special Supp.), John Lewis, Tech. Ed., Feb. 5, 2001.

* cited by examiner

*Primary Examiner*—William C Joyce
(74) *Attorney, Agent, or Firm*—Klarquist Sparkman LLP

(57) ABSTRACT

A vehicle shifter and method in one form involves tilting a shift lever relative to a steering wheel as the steering wheel is tilted and also raising and lowering the shift lever respectively as the steering wheel is raised and lowered.

39 Claims, 13 Drawing Sheets

VEHICLE SHIFTER

RELATED APPLICATION DATA

This application claims priority to U.S. provisional patent application filed Feb. 23, 2000, serial No. 60/184,486, entitled, "Shift Mechanism For A Vehicle", by Norman E. Ritchie and Sorin Anghelus, which is hereby incorporated by reference.

BACKGROUND

It is common for vehicles to include a steering column that permits the adjustment of the height of a steering wheel and also allows the steering wheel to be tilted toward or away from a driver of a vehicle. Thus, these conventional steering columns telescope or otherwise allow elevation adjustment of the steering wheel and also typically pivot (or have a pivot section which pivots) to permit tilting of the steering wheel. Release mechanisms are typically incorporated in these devices which are then actuated to respectively permit height and tilt adjustment of the steering wheel.

In these prior constructions, it is common for a lever shift mechanism to be positioned in close juxtaposition relative to the steering wheel. In a conventional approach, however, the shift mechanism is at a fixed location. Consequently, as the elevation and tilt of the steering wheel is adjusted, the distance from the shift lever of the shift mechanism to the steering wheel changes because the shift lever remains stationary. This can result in the positioning of the shift lever relative to the steering wheel at an ergonomically inefficient location. Also, it is common for the shift lever or handle to move in a plane which is generally perpendicular to the plane of the steering wheel to accomplish shifting. Consequently, depending on the position of the steering wheel, the clearance between the shift lever and steering wheel can be relatively tight, making it more difficult to shift the lever. In addition, the location of the shift lever is typically positioned to provide a minimum clearance when the steering wheel is nearest to the shift lever. Consequently, when the steering wheel is farther away from the shift lever in other operating positions, a longer reach is required from the steering wheel to operate the shift lever. Also, the angle of the shift lever can result in mechanical disadvantages in operating the shift lever when the steering wheel is tilted and/or elevated to certain positions.

Therefore, a need exists for an improved shift mechanism and methods relating thereto.

SUMMARY

In accordance with one embodiment, a vehicle shifter for actuating a shift cable of a vehicle to cause the shifting of a vehicle transmission is described. The vehicle in this embodiment is of a type having a steering wheel tilt head which allows tilting of the steering wheel at least in fore and aft directions about a tilt pivot axis. The tilt head broadly includes any type of mechanism, including a simple pivot structure, which allows tilting of the steering wheel. The tilt head is carried at an upper end portion of a steering column and is typically pivoted to the steering column so as to allow the steering wheel to tilt in fore and aft directions. In addition, the steering column may be adjustable in length to raise or lower the elevation of the tilt head relative to the floor of the vehicle and thereby to respectively raise or lower the steering wheel. Consequently, in a conventional manner the elevation and tilt position of the steering wheel may be adjusted as desired by a driver of the vehicle.

In this embodiment, a shift lever support is pivotally coupled to the tilt head and may pivot about a shift lever support pivot axis. The shift lever support pivot axis may be skewed relative to a steering wheel axis about which a steering wheel is rotated to steer the vehicle. More specifically, in one exemplary form, the shift lever support pivot axis is substantially perpendicular to the steering wheel axis.

A shift lever is carried by the shift lever support and movable relative to the shift lever support to a plurality of shift positions to cause shifting of the vehicle. Various gate structures, detent and detent receiving mechanisms, stop structures or other structures may be used to positively define various shift positions to which the shift lever may be shifted.

An elongated shift actuator, which in one form may be of an upright shift rod, has an upper portion coupled to the shift lever and a lower portion coupled to the shift cable such that movement of the shift lever from one shift position to another shift position moves the shift actuator and cable to shift the vehicle transmission. The shift actuator may be coupled to the cable in a variety of ways and typically utilizes a crank mechanism to deliver the shifting force to the cable upon movement, such as pivoting movement, of the shift lever to the various shift positions.

A shift actuator support is positioned below the shift lever support and coupled to the shift actuator so that, in this embodiment, the lower portion of the shift actuator (or the entire shift actuator) moves upwardly relative to the floor of the vehicle as the steering wheel is raised and the lower portion of the shift actuator moves downwardly relative to the floor of the vehicle as the steering wheel is lowered.

As another aspect of an embodiment, the steering column may include a first movable section which is raised to lengthen the steering column as the steering wheel is raised and lowered to shorten the steering column length as the steering wheel is lowered. The shift actuator support may be coupled to the first movable section of the steering column such that the shift actuator support moves with the first movable section. In addition, a lower portion of the shift actuator may be coupled to the shift actuator support so as to move with the movement of the shift actuator support.

In accordance with another embodiment, a multi-directional bearing structure, such as a spherical bearing, may be used to couple the shift actuator to the shift actuator support. In addition, at least one crank may be coupled to the shift cable and to the shift actuator. Movement of the shift lever from one shift position to another shift position in this example pivots the shift actuator and also pivots the at least one crank to move the shift cable to shift the vehicle transmission. The crank may be positioned above or below the spherical bearing and in one desirable embodiment is positioned below the spherical bearing.

In accordance with another embodiment, the shift actuator may be elongated with a lower portion slidably coupled to the shift actuator support so as to slide upwardly relative to the shift actuator support as the steering wheel is raised and downwardly relative to the shift actuator support as the steering wheel is lowered. In addition, as an option, at least one crank may be coupled to the shift cable and to the shift actuator such that the shift actuator is slidable upwardly and downwardly relative to the crank as the steering column is respectively raised and lowered. In this latter case, movement of the shift lever from one shift position to another shift position pivots the shift actuator and also pivots the at least one crank to move the shift cable to shift the vehicle transmission. As a further option, the shift actuator may comprise a rod having a longitudinal axis and a splined coupler at a lower portion of the rod. The splined coupler may comprise a plurality of splines having a length which extends in a direction parallel to the longitudinal axis of the rod. In addition, the crank may comprise a splined coupler receiver configured to slidably receive the splines of the splined coupler so as to permit upward and downward movement of the splined coupler and thereby the rod relative to the crank as the steering wheel is raised and lowered. In addition, the splined coupler receiver may engage the splined coupler to prevent relative rotation of the crank and the rod as the shift lever is pivoted.

In accordance with an embodiment, the vehicle shifter may comprise a projecting elongated cable support coupled to a movable section of the steering column and extending outwardly from the steering column. In this embodiment, the shift cable may be supported by the cable support at a location spaced from the crank. Inasmuch as the cable support is coupled to the movable section of the steering column in this embodiment, raising and lowering the steering column respectively raises and lowers the cable support. In one specific form, the elongated cable support may comprise an arm which is included in the shift actuator support either as an integral component thereof or as a separate element coupled thereto. In addition, the shift actuator may comprise a shift rod having a lower end portion coupled to the crank and a spherical bearing coupling a lower portion of the rod to the shift actuator support, for example, at a location above the crank. As a result, in this embodiment the rod is coupled to the first movable section of the steering column.

The shift actuator may be coupled to a first crank which is coupled, such as by a link member, to a second crank. The second crank may be coupled to the shift cable. The cranks are operable such that shifting of the shift lever from one shift position to another shift position pivots the shift actuator and the first and second cranks to move the shift cable and shift the vehicle transmission. The respective first and second cranks may be positioned at opposite sides of the steering column from one another. In addition, as an option, the shift actuator may be slidably coupled to the first crank so as to permit upward movement of the shift actuator relative to the first crank with the upward movement of the steering wheel and downward movement of the shift actuator relative to the first crank upon downward movement of the steering wheel.

As another approach, the shift actuator may be coupled to at least one crank which in turn is coupled to the shift cable such that movement of the shift lever pivots the shift actuator and the crank to in turn move the shift cable and shift the vehicle transmission. In this embodiment, a slide may be slidably positioned in a slide guide with the crank being coupled to the slide. In addition, the cable may also be coupled to the slide. In this construction, pivoting the crank slides the slide along the slide guide to thereby move the shift cable to shift the transmission. In addition, desirably the crank is positioned at one side of the steering column and at least a majority of the slide guide is positioned at the opposite side of the steering column from the crank.

The steering column may include a first movable section which is raised as the steering wheel is raised and lowered as the steering wheel is lowered. In addition, the shift actuator support may be coupled to the first movable section for upward and downward movement with the first movable section of the steering column. The slide guide may also be coupled to the movable section such that the slide guide moves upwardly and downwardly with the movable section as the elevation of the steering wheel is adjusted.

The slide guide may be in the form of a slot defined by a bracket with the bracket comprising a portion of the shift actuator support although the bracket may be a separate component. Desirably, a link couples the crank to the slide and the slide comprises a slide pin. In addition, a first multi-directional bearing structure, such as a spherical bearing, may couple a lower portion of the shift actuator to the shift actuator support. In one desirable form, the crank is positioned above the first spherical bearing. A second multi-directional bearing structure such as a spherical bearing may couple the crank to the link and a third multi-directional bearing structure such as a spherical bearing may couple the link to the slide pin.

In one specific form, the shift actuator support comprises a bracket having a first leg section with an upper end portion coupled to the first movable section of the steering column, an outwardly projecting platform section for coupling to the shift actuator, a downwardly projecting cable engaging section for coupling to the cable at a location spaced from the slot, and an inwardly projecting slot defining section projecting in a direction away from the platform section. A major portion of the slot, and more desirably substantially the entire slot, may be positioned at the opposite side of the steering column from the crank. The shift actuator support may comprise a unitary one-piece monolithic bracket of a homogeneous material.

In accordance with one aspect of a method, a vehicle shift lever is pivoted relative to a vehicle steering wheel as the vehicle steering wheel is tilted. In addition, the elevation of the shift lever is raised with the raising of the elevation of the steering wheel and lowered with the lowering of the elevation of the steering wheel. The shift lever may be pivoted about an axis which is substantially perpendicular to the axis about which the steering wheel is rotated as the steering wheel is used to steer the vehicle. In addition, in accordance with an embodiment of the method, the act of pivoting the shift lever about a pivot axis may comprise pivoting the shift lever about a pivot axis which is located above the pivot axis about which the steering wheel is tilted.

The present invention is directed toward new and unobvious aspects and features of a vehicle shifter and vehicle shifting methods both alone and in combination with one another. It is not limited to situations wherein a steering column is both tiltable and/or carried by a steering column which may be adjusted in length to raise and lower the steering wheel, although this is the most desirable application. The new and unobvious aspects of the invention are set forth in the claims below.

DETAILED DESCRIPTION

Figure 2:
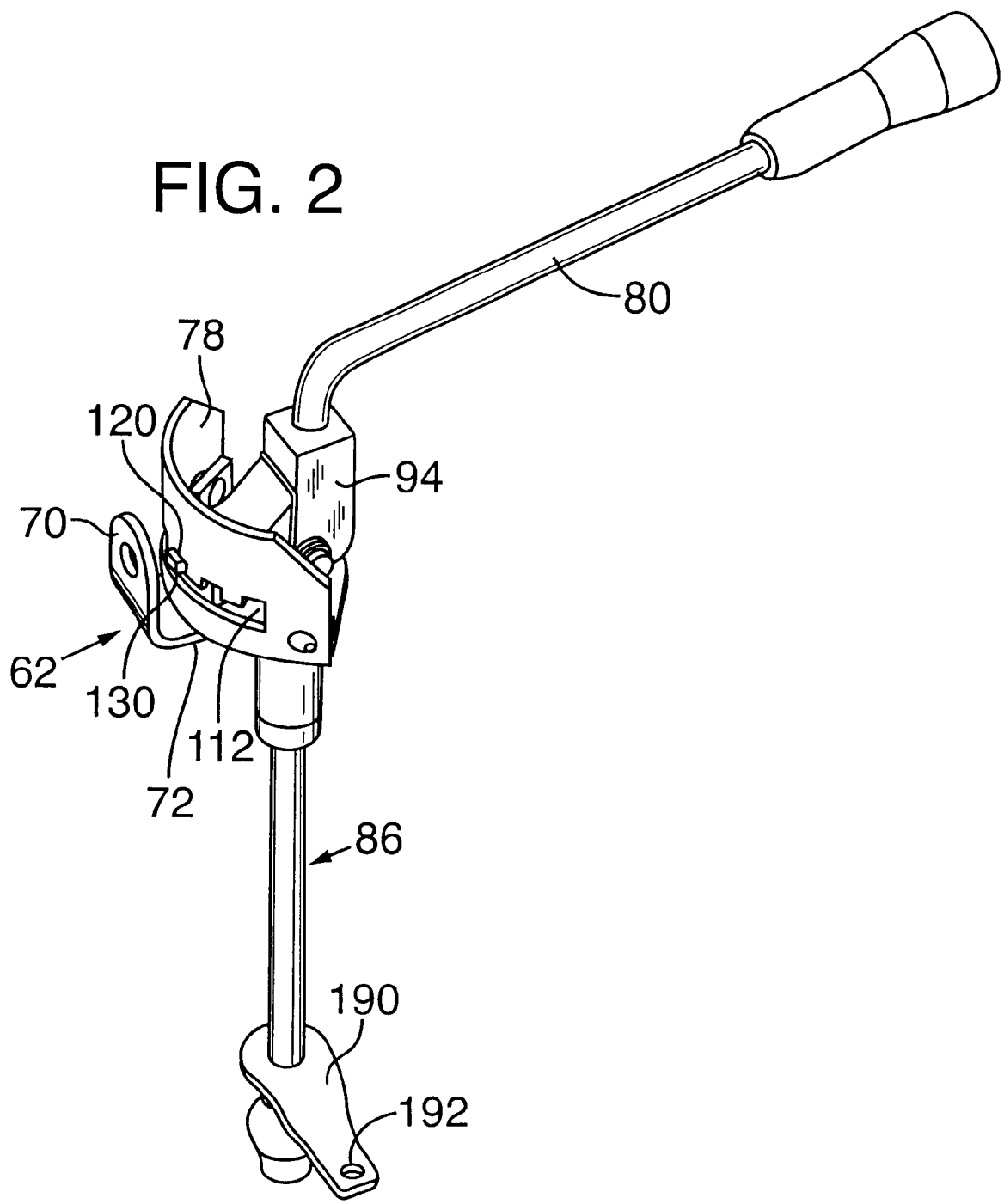
FIG. 2 is a broken-away view of a portion of the vehicle shifter of FIG. 1, including a shift lever, one form of a shift lever support, and a form of shift actuator.
Figure 3:
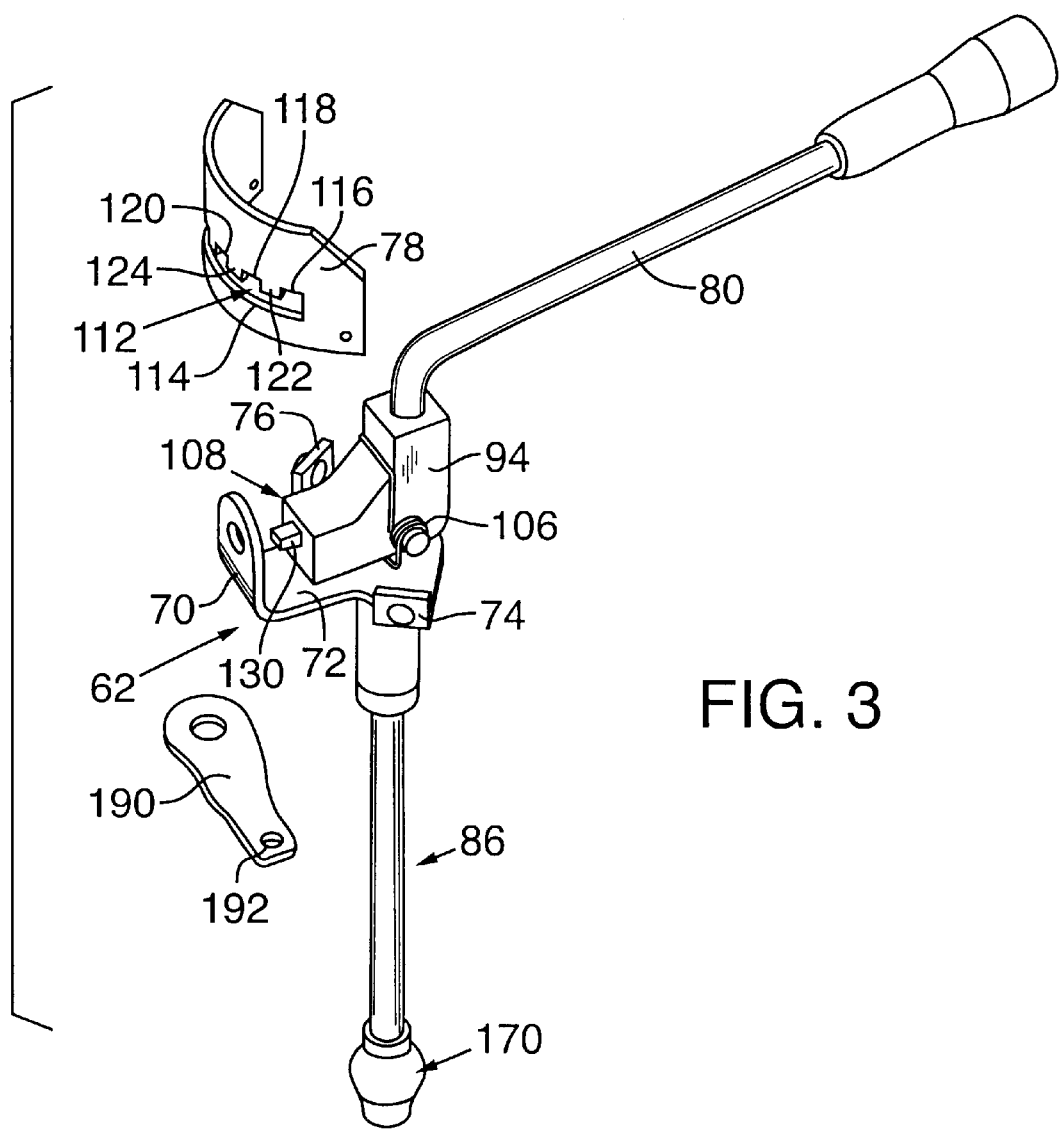
FIG. 3 is an exploded view of the mechanism shown in FIG. 2.
Figure 4:
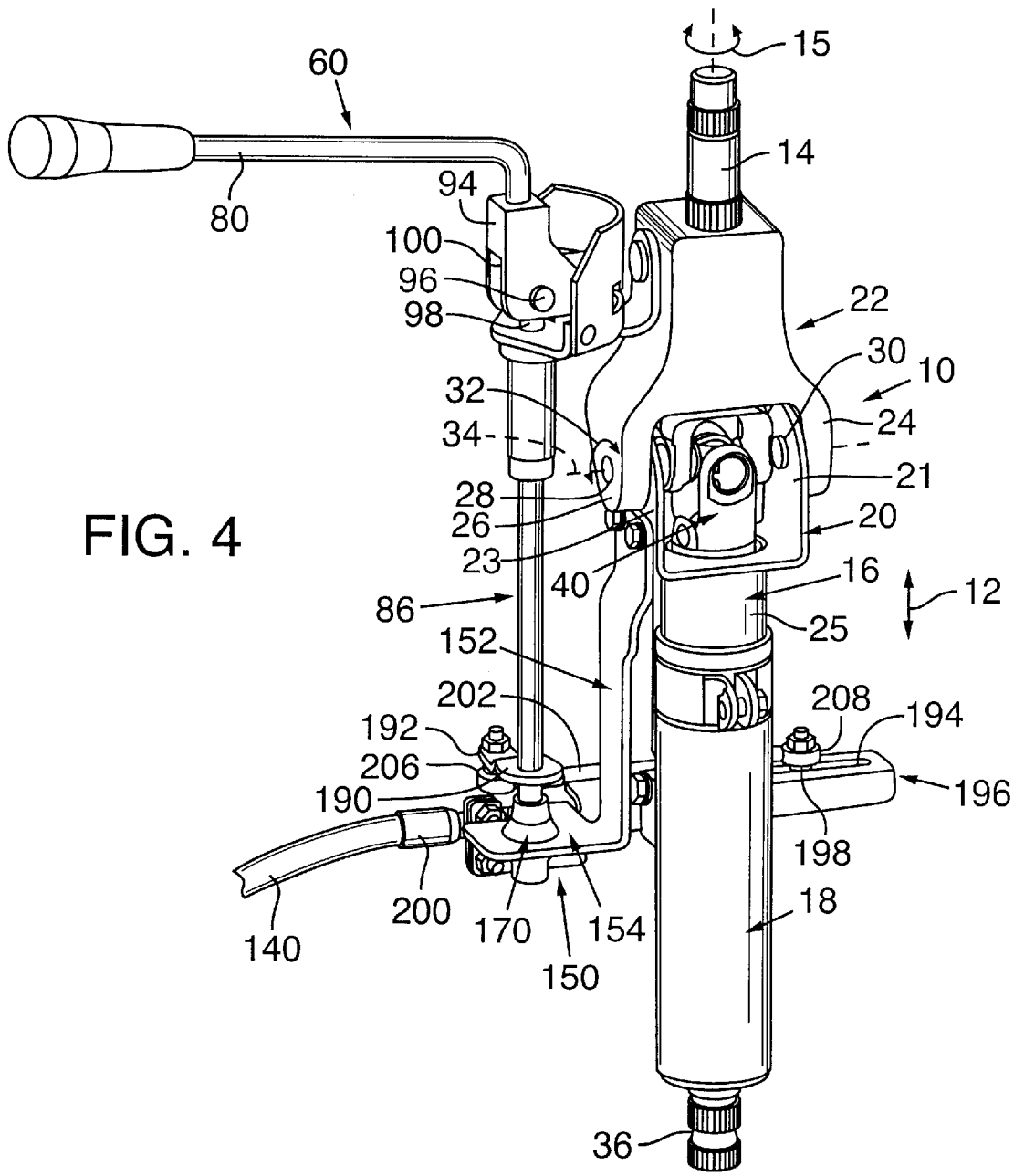
FIG. 4 is a perspective view of the apparatus of FIG. 1 with the steering wheel removed and looking generally in a direction opposite to the direction shown in FIG. 1.

With reference to FIGS. 1–4, an adjustable steering column 10 is shown. The steering column is adjustable upwardly and downwardly as indicated by arrows 12 to adjust the elevation of a steering wheel 19 relative to the floor of a vehicle. The vehicle floor is indicated schematically at 13. The steering wheel 19 is mounted, for example, to a shaft 14 (FIG. 4). The steering wheel is rotatable about an axis 15 to steer the vehicle in a conventional manner. The steering column is mounted, such as by brackets (not shown), to the vehicle in a position where the steering wheel is accessible by the driver of the vehicle. The illustrated steering column 10 includes a movable portion 16 which is raised and lowered to adjust the elevation of the steering wheel. As best seen in FIG. 4, the illustrated steering column 10 includes a fixed portion 18 which, in this form, telescopingly receives a tubular portion 25 of the movable steering column section 16. In addition, a generally U-shaped bracket 20 is carried at the upper end of tubular section 19. The bracket 20 has first and second spaced apart upwardly extending leg portions 21,23. Typically, a release mechanism, not shown, is actuated to release the steering column such that the steering wheel may be raised. The adjustable length steering column may take any suitable form. Adjustable length steering columns are commercially available in numerous vehicles in the marketplace, such as in trucks from Freightliner LLC.

In the illustrated embodiment, a tilt mechanism such as a tilt head, one form of which is indicated generally at 22, couples the steering wheel 19 to the steering column such that the steering wheel may be tilted at least in fore and aft directions (away from and toward) relative to a driver positioned in the driver's seat of the vehicle. The tilt head 22 may take any suitable form. In the illustrated embodiment, the tilt head has first and second legs 24,26 (FIG. 4) which are spaced apart so as to receive the legs 21,23 of bracket 20 therebetween. Respective pivot pins 28,30 couple the respective legs 24,26 to associated legs 21,23 of the bracket 20. Consequently, the tilt head 22, and steering wheel 19 carried thereby, may be tilted as indicated by arrows 32 in respective opposite directions about a pivot axis 34 through the respective pins 28,30. The steering wheel shaft 14 is coupled to a lower steering wheel shaft portion 36 such that rotation of shaft section 14 in response to turning of the steering wheel rotates shaft 36 and results in the steering of the vehicle. The shaft sections 14,36 are coupled together in any convenient way such as utilizing a universal joint indicated generally at 40 in FIGS. 1 and 4. A tilt cylinder 42, which may be pneumatic or hydraulic, may be extended to tilt the steering wheel forwardly about pivot axis 34 and may be retracted to tilt the steering wheel rearwardly about this pivot axis. Cylinder 42 may also, for example, simply be a flow-through shock absorber which resists the tilting movement of the steering wheel such that, when released by a release mechanism not shown, the driver may manually adjust or tilt the steering wheel position. Any suitable tilt mechanism may be used for supporting the steering wheel for selective tilting.

Figure 1:
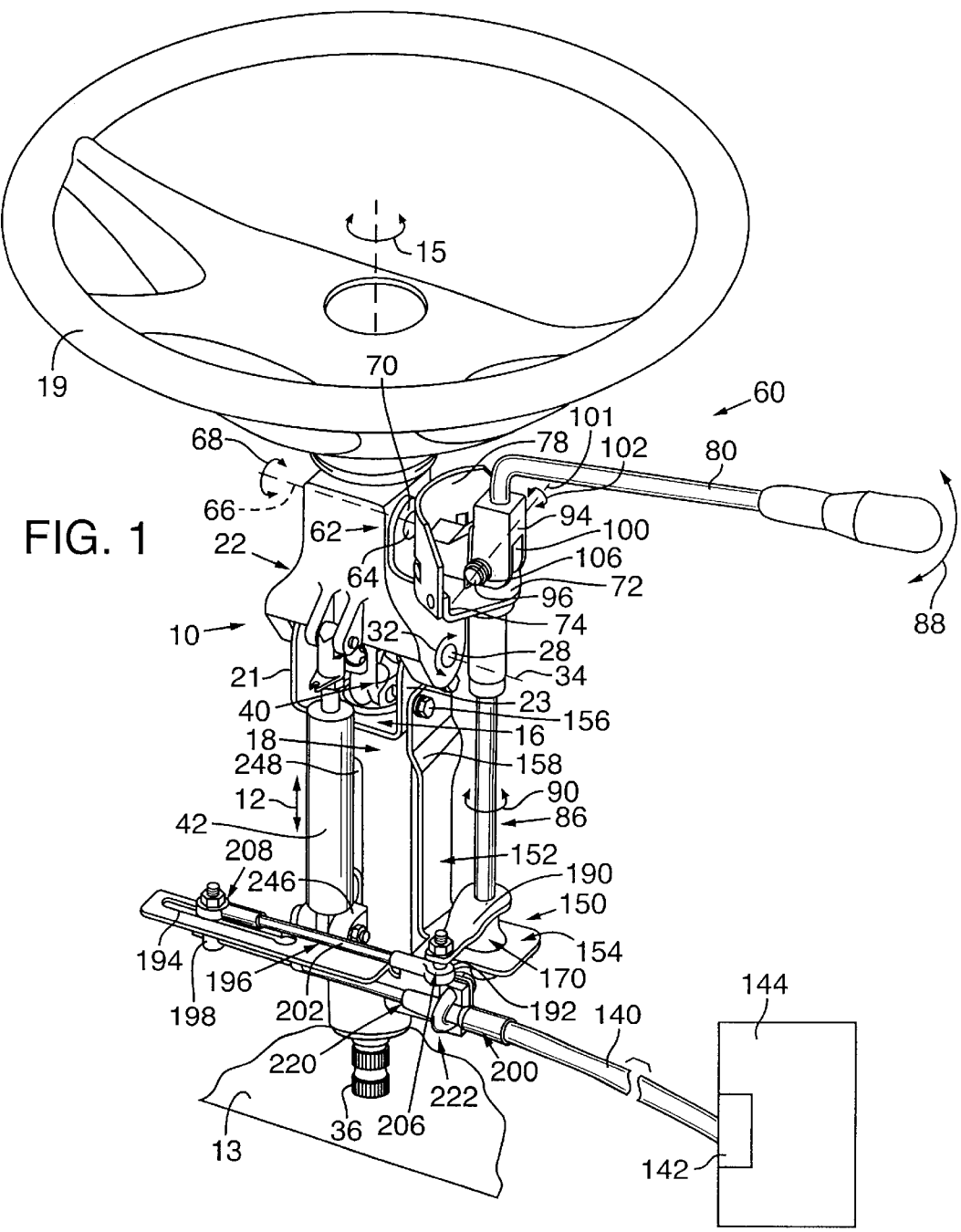
FIG. 1 is a perspective view of one embodiment of a vehicle shifter looking generally in a direction toward the front of a vehicle.

One form of a vehicle shifter is indicated generally at 60 in FIG. 1. The shifter 60 includes a shift lever support, one form of which is indicated at 62. The illustrated shift lever support 62 is pivoted by a pin or bearing 64 to the tilt head 22 for pivoting about a shift lever support pivot axis indicated at 66. The shift lever support in this case may pivot in respective fore and aft directions indicated by arrow 68. In this example, the pivot axis 66 is parallel to the pivot axis 34. Although not required, in this case the pivot axis 34 is below the pivot axis 66. It should be understood that, although desirable, the shift lever support is not required to be supported in a manner which limits pivoting motion to motion about a pivot axis. For example, spherical bearings or other multi-direction pivot couplings may be used. The illustrated shift lever support 62 includes an upright leg portion 70 and an outwardly projecting lever support portion 72. In the form shown, the shift lever support includes first and second upwardly extending flanges 74,76 (see FIG. 3) to which an arcuate shift gate 78 is attached, such as by bolts extending through apertures in the gate 78 and flanges 74,76. A shift lever 80 is carried by shift lever support 62 and, in the illustrated embodiment, is coupled to a shift actuator. The shift actuator may take the form of a shift rod 86, such that pivoting of the shift lever 80 in directions indicated by arrows 88, causes the rod 86 to pivot about the longitudinal axis of the rod as indicated by arrows 90.

More specifically, in the form shown, the shift lever 80 includes a shift actuator portion 94 which is pivoted by a pin 96 to an upwardly projecting portion 98 (FIG. 4) of the shift rod 86. The lower portion of shift actuator 94 is bifurcated so as to define a channel 100 into which the rod extension 98 extends. When mounted in this manner, the lever 80 may be pivoted about the axis 101 of pivot pin 96 in a direction indicated by arrows 102. A biasing spring 106 biases the distal end portion 108 of shift actuator 94 in an upward direction (see FIG. 3). The illustrated shift gate 78 defines a slot 112 bounded by a lower edge 114 which is generally smooth. The upper edge of slot 112 has a plurality of shift position defining notches or voids (three of which are indicated in FIG. 3 at 116,118 and 120) separated by downwardly extending projections, two of which are indicated by the numbers 122 and 124. The distal end portion 108 of the shift position actuator and thus of the shift lever includes a shift position defining projection 130.

To shift the vehicle, the outer end of the shift lever may be raised to cause a corresponding downward movement of tab 130. When tab 130 moves downwardly, it eventually engages the lower edge 114 of slot 112 and moves out of the shift position defining notch in which it was disposed. In FIG. 2, tab 130 is shown at the shift position defined by notch 120. When disengaged, the shift lever may be pivoted in directions indicated by arrow 88 (FIG. 1) to shift the tab 130 into alignment with another one of the notches (e.g., notch 118). The tab 130 is positioned in the selected notch to complete the shifting operation. A spring 106 biases the tab 130 upwardly and into the desired notch. Any convenient approach may be used for defining shift positions. For example, the gate 70 may project downwardly below the support 62. Other alternatives may also be used. Also, other forms of the shift lever support may be used which pivotally couple the shift position defining lever to the tilt head.

With the above construction, tilting of the steering wheel in fore or aft directions results in tilting of the shift lever support 62 relative to the steering wheel. Consequently, a more constant spacing is achieved between the steering wheel and shift lever 80 even though the steering wheel has been tilted.

As mentioned above, the elongated shift actuator, in this case the rod 86, has an upper portion coupled to the shift lever and also has a lower portion coupled to a shift cable 140 (FIG. 1). Various coupling mechanisms may be used which are operable such that movement of the shift lever from one shift position to another shift position moves the shift actuator, in this case pivots the shift actuator, to cause the cable 140 to move to shift a transmission 142 of an engine 144 of a vehicle. In FIG. 1, the transmission 142 and engine 144 are indicated schematically.

Desirably, a shift actuator support is coupled to the shift actuator in a manner that allows the lower portion of the shift actuator (and in the case shown in FIG. 1 the entire shift actuator) to move upwardly relative to the floor 13 of the vehicle as the steering wheel is raised and to move downwardly relative to the floor of the vehicle as the steering wheel is lowered. In one approach, the shift actuator support may comprise an element or member coupled to the movable part of the steering wheel column and which also carries the shift actuator such that as the steering column is raised the shift actuator support raises as does the carried shift actuator. Conversely, as the steering wheel is lowered, the shift actuator support moves downwardly with the movable portion of the steering column and also moves the shift actuator downwardly. In an alternative approach, the shift actuator moves upwardly and downwardly relative to the shift actuator support as the steering wheel is raised and lowered.

In one specific embodiment as shown in FIG. 1, the shift actuator support comprises a bracket indicated generally at 150. The illustrated bracket has a first section 152 coupled to the movable portion 16 of the steering column and a second portion 154 coupled to the rod 86. The bracket may be fixed or otherwise mounted to the movable portion of the steering column such as by welding, bolts (e.g., see bolt 156) or otherwise. In the embodiment shown, bracket section 152 extends upwardly with an upper end portion thereof being bolted to the leg 23 of the movable portion 16 of the steering column. To provide additional clearance, section 152 may be bent outwardly, such as indicated at 158, and away from the steering column. The section 154 in the form shown is generally planar and extends outwardly, such as at about 90 degrees, from the section 152. The rod 86 is coupled to section 154 so as to permit pivoting movement of the rod 86 as indicated by arrows 90. In the embodiment shown in FIG. 1, tilting of the rod relative to section 154 is desirable to accommodate movements of the vehicle shifter as the steering wheel is tilted. A multi-directional bearing structure may be used for this purpose such as a conventional spherical bearing 170. Suitable bearings are available, for example, from Alinabal, Inc.

In the embodiment shown in FIG. 1, at least one crank 190 is coupled to rod 86 such that pivoting of the rod pivots the crank. The distal end 192 of the crank 190 may be connected directly to the cable 140, typically through a swivel, such that pivoting of the rod 86 pivots the crank 190 to move the cable 140 and shift the vehicle transmission. In the example shown in FIG. 1, the crank 190 is positioned above the spherical bearing 170. Also, in the FIG. 1 embodiment, the crank 190 is coupled to the cable 140 by a guide mechanism. In particular, a slide guide is provided, which in the illustrated form comprises an elongated slot 194 defined by a bracket section 196. In the illustrated form shown, bracket section 196 is coupled to the movable portion of the steering column such that the slot and bracket section 196 moves upwardly and downwardly (e.g., in the direction of arrows 12) as the steering wheel is raised and lowered. A slide is slidably engaged by the slide guide. In this example, the slide comprises a slide pin 198 which is coupled through a swivel 200 to the cable 140. Although other mechanisms may be used, in this embodiment a link 202 couples the distal end 192 of the crank 190 to the slide 198.

The bracket section 196 may be generally planar. The link 202 may be positioned above the bracket section 196 with the cable coupling, including the swivel 200, positioned below the slot defining portion of bracket section 196. To accommodate the pivoting movements involved in this construction, respective multi-directional pivot structures, such as spherical bearings 206,208 may be used to couple one end portion of the link 202 to the crank distal end 192 and the opposite end portion of the link to the slide. Links of this type are commercially available, such as from Alinabal, Inc. Although spherical bearings are desirable, other coupling approaches (e.g., multiple bearings or alternatives) may be used to accomplish these connections.

As can be seen in FIG. 1, at least a major portion (and desirably substantially all) of the slide guide, in this case the slot 194, is positioned at the opposite side of the steering column from the crank 190. This results in a highly compact mechanical construction.

The bracket section 196 may be otherwise mounted so as to permit upward and downward movement as the steering wheel is raised and lowered, or fixed in place in the event a non-height adjustable steering column is used. In addition, bracket section 196 may be a stand alone component, and may take other shapes besides the shape shown in FIG. 1. However, in a desirable form as shown in FIG. 1, the bracket section 196 is coupled to and in this case forms a part of the actuator support bracket 150. More specifically, bracket 150 includes a portion 220 which projects downwardly from section 154. The bracket section 196 is coupled to section 220 and extends in an opposite direction from the direction to which section 154 projects. The upper surface of sections 154,196 may be in a common plane.

In addition, the cable may be coupled, such as by a cable carrier 222, to bracket section 220. In this case the cable 140 is supported at a location spaced from the crank 190 and also at a location spaced from the slide pin 198.

Figure 5:
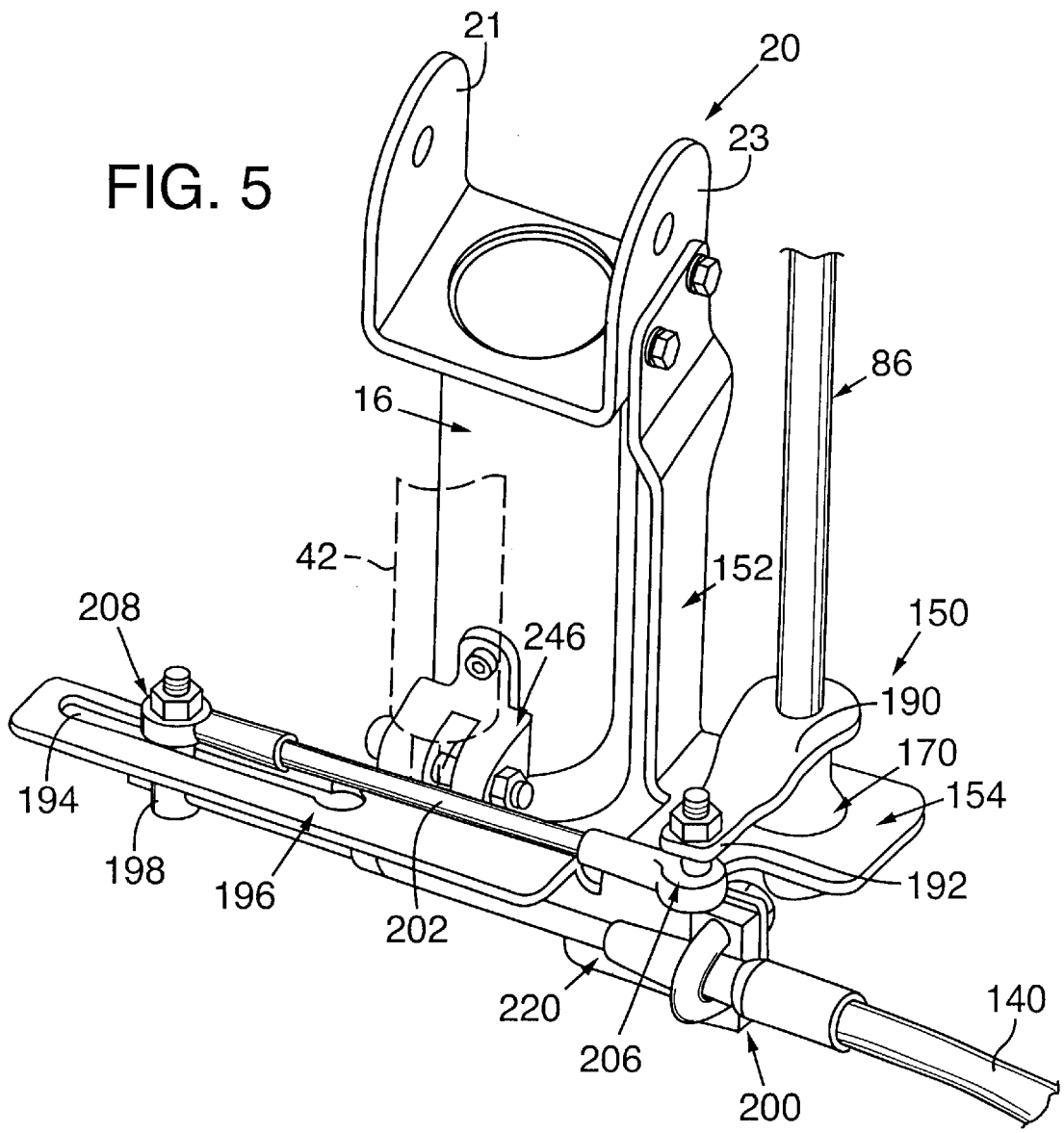
FIG. 5 is a view of one embodiment of portions of a vehicle shifter for coupling a shift actuator such as a shift rod to a shift cable and also to a portion of a steering column.
Figure 6:
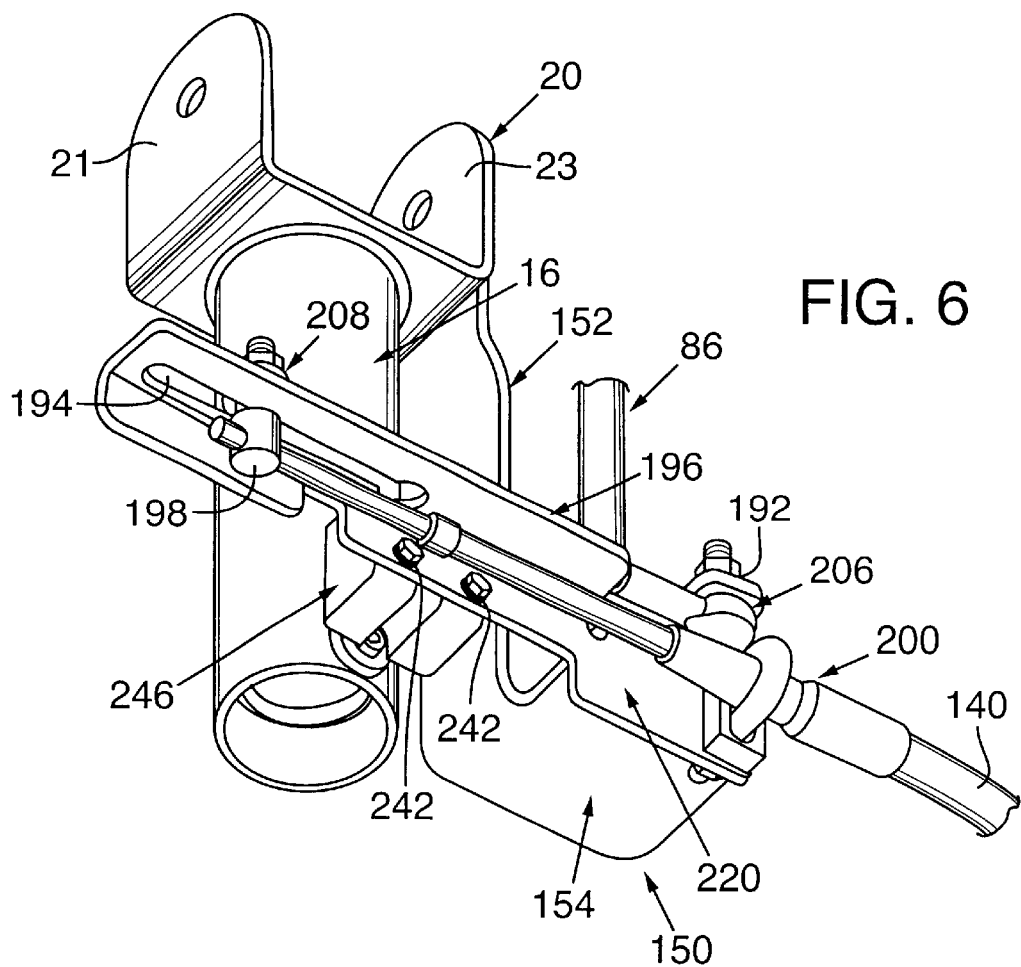
FIG. 6 is a view of the mechanism of FIG. 5 looking generally from below.

FIGS. 5 and 6 illustrate the above-described construction in greater detail.

Although less desirable, it should be noted that the crank/slide guide cable moving construction shown in FIGS. 5 and 6 is not limited to applications wherein a steering wheel column is adjustable in length and/or wherein a steering wheel is tiltable. In the form shown in FIG. 6, the downwardly projecting section 220 of bracket 150 also extends in the same direction as the bracket section 196. The sections 220 and 196 thus form an angle bracket which provides a reinforced construction. In addition, section 220 may be coupled (e.g., by respective bolts 242) to a cylinder mounting bracket 246 to which the cylinder 42 is mounted (see FIG. 1). As can also be seen in FIG. 1, the fixed portion 18 of the steering column 10 may include an upright elongated slot 248 which accommodates the bracket 246 such that the bracket 246 is free to slide upwardly and downwardly relative to steering column section 18 with the movement of the movable section 16 of the steering column.

Figure 7:
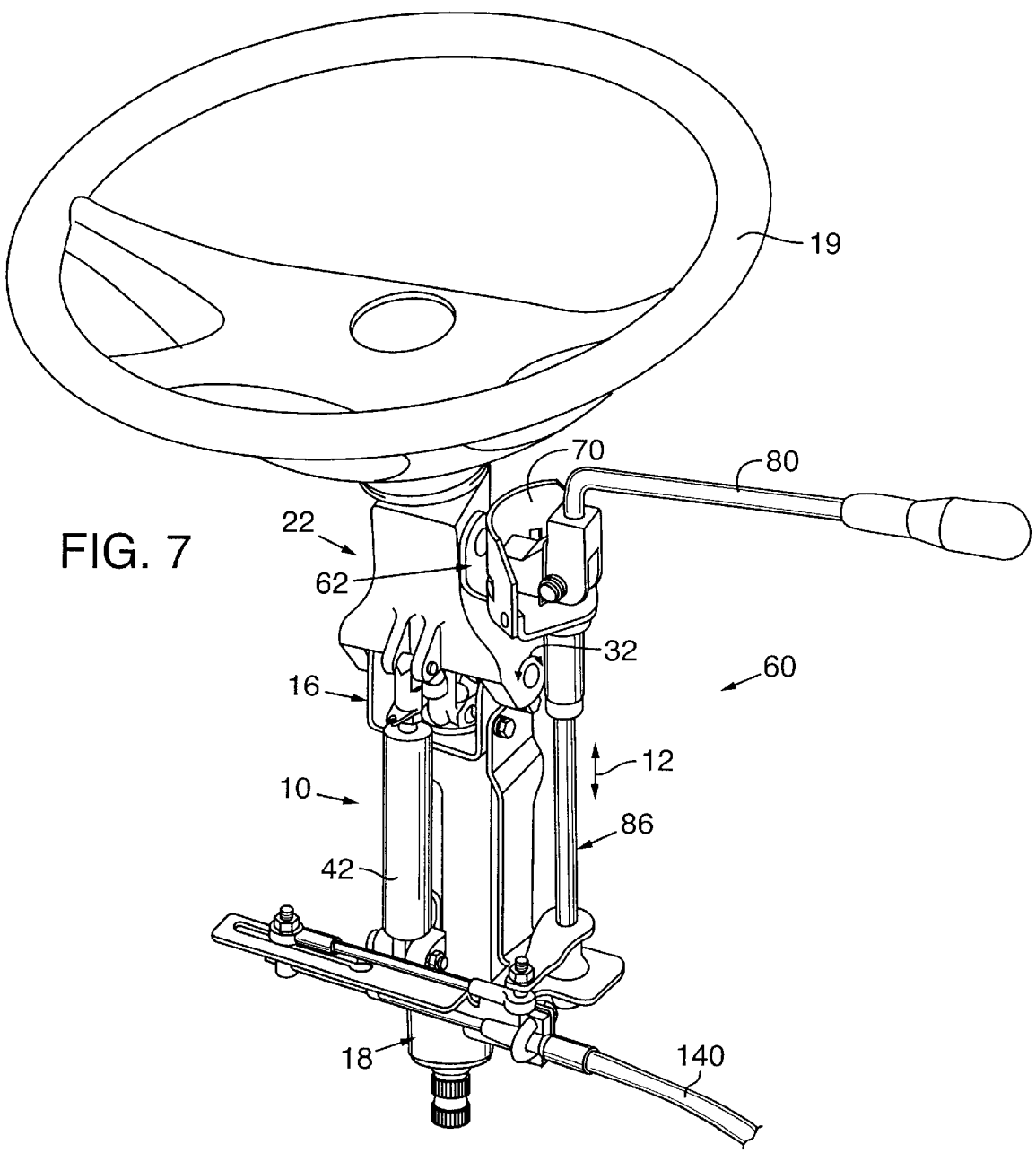
FIG. 7 is a perspective view of the embodiment of FIG. 1 with the steering wheel tilted in an aft direction toward a driver's seat and in a lowered position.
Figure 8:
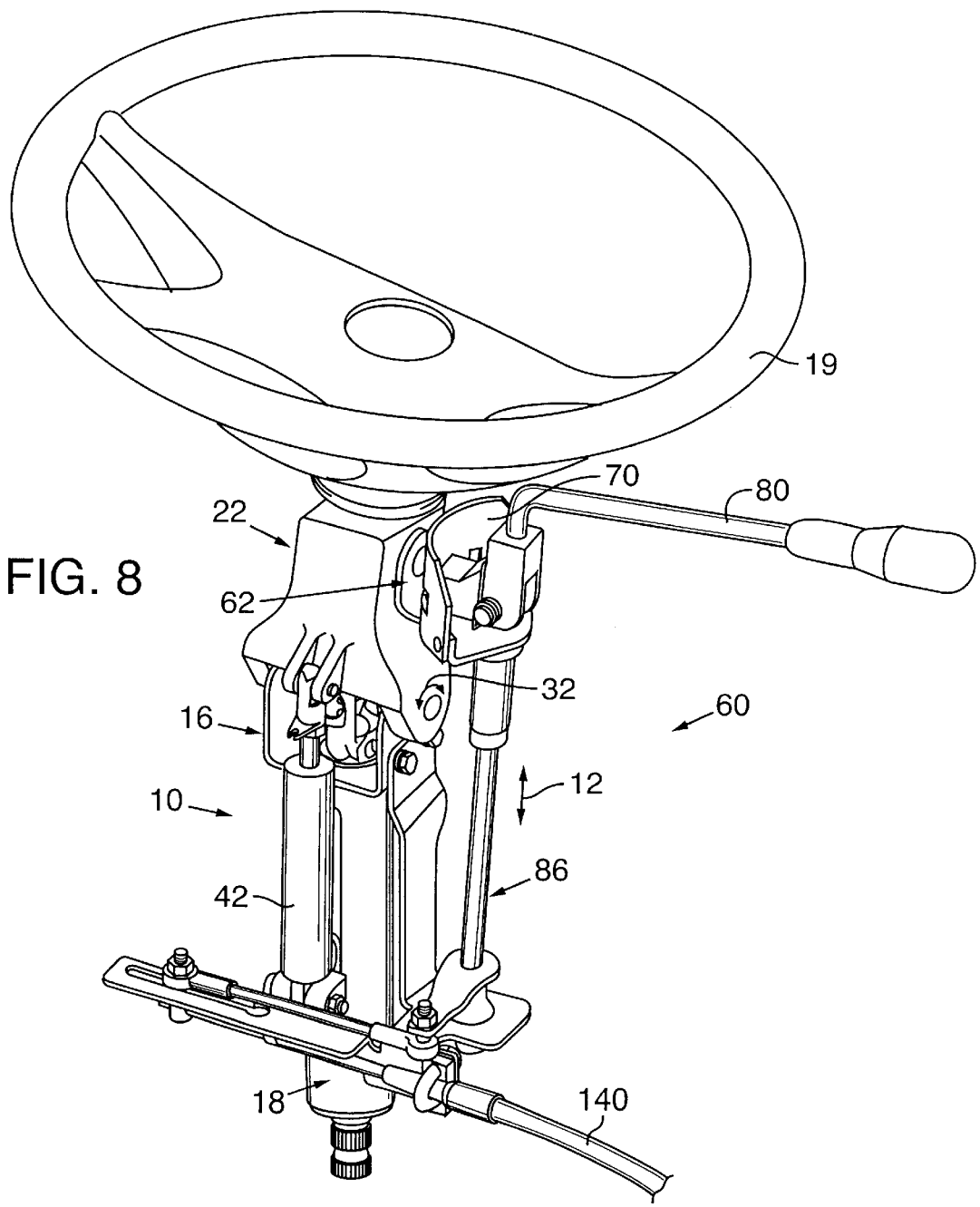
FIG. 8 is similar to FIG. 7 except with the steering wheel tilted forwardly away from a driver's seat.
Figure 9:
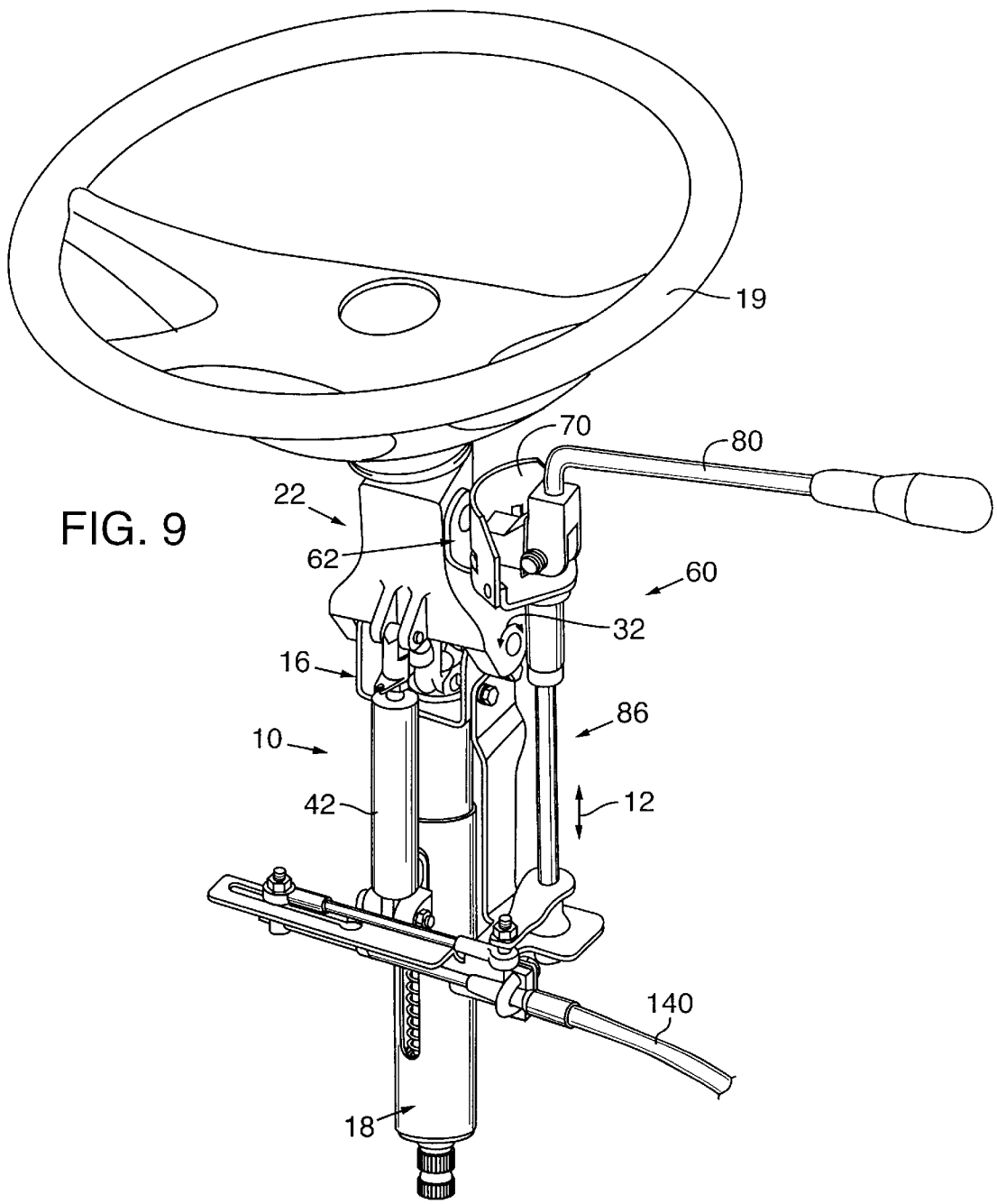
FIG. 9 is a perspective view of the embodiment of FIG. 1 with the steering wheel tilted in an aft direction and with the steering wheel elevated by extending the length of the steering column.
Figure 10:
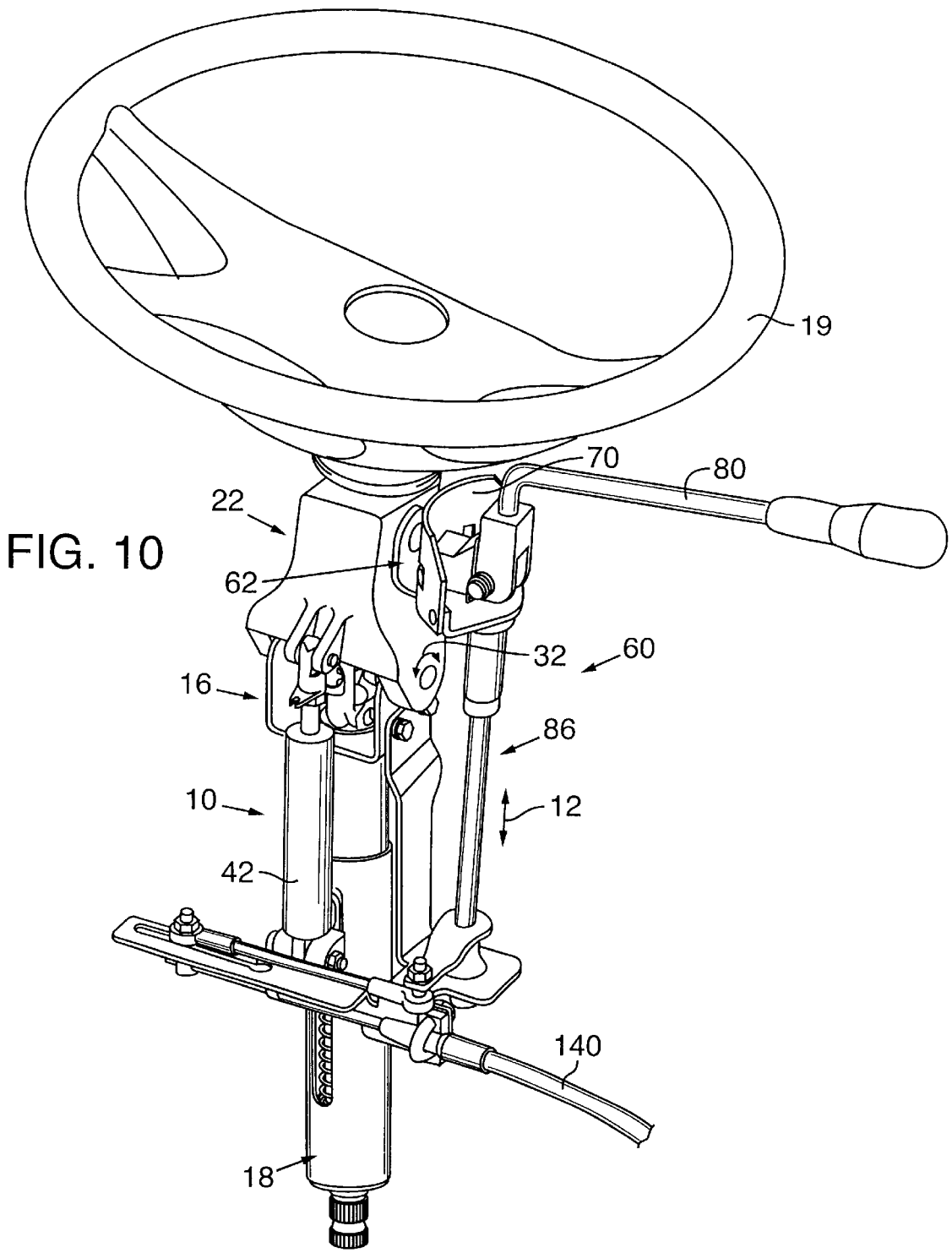
FIG. 10 is a view similar to FIG. 9 except with the steering wheel tilted forwardly.

With reference to FIGS. 7–10, in the illustrated construction, as the steering wheel 19 elevation is changed by adjusting the position of the movable portion of the steering column 16 upwardly or downwardly (see arrows 12), the rod 86 and other elements of the illustrated form of shift mechanism correspondingly shift upwardly and downwardly. FIGS. 7 and 8 correspond to a retracted or downward position of the steering column. In contrast, FIGS. 9 and 10 illustrate an extended or lengthened position of the steering column. Thus, in FIGS. 9 and 10 the steering wheel 19 is elevated relative to the steering wheel position shown in FIGS. 7 and 8. With this construction, the relative position of the steering wheel 19 and shift lever 80 is generally maintained as the steering wheel elevation changes. In addition, as the steering wheel is tilted forwardly or away from the driver (see arrows 32 in FIGS. 7–10), some movement of the shift lever support 62, gate 70 and shift lever 80 takes place. This assists in maintaining the relative position of the steering wheel 19 and shift lever 80 more constant even as the steering wheel is tilted. FIGS. 7 and 9 show an aft (toward the driver) tilted position of the tilt head 22 and thus of the steering wheel 19. In contrast, FIGS. 8 and 10 show the steering wheel tilted forwardly (away from the driver).

Figure 11:
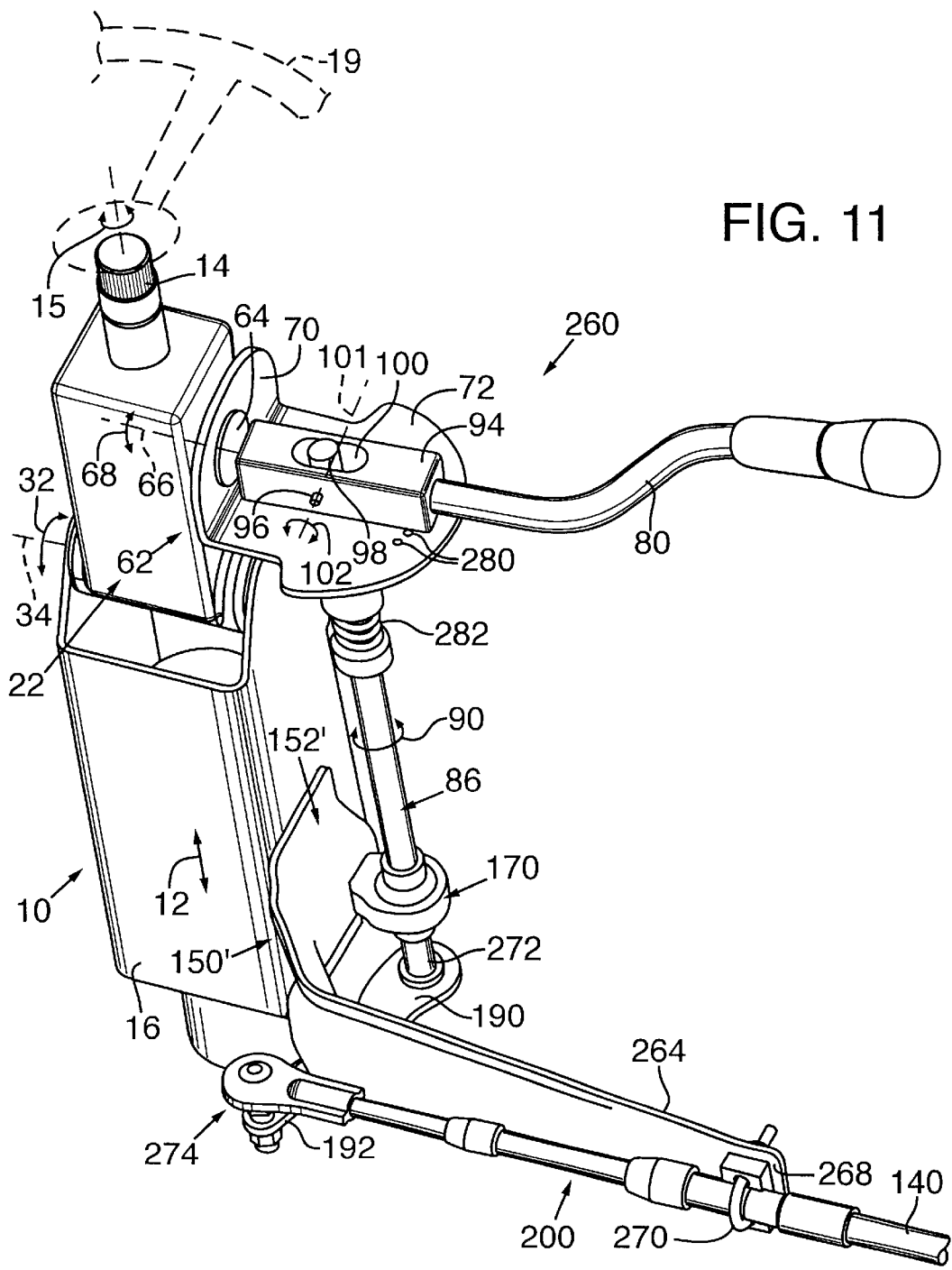
FIG. 11 is a perspective view of an alternative form of vehicle shifter

FIG. 11 illustrates an alternative form of vehicle shifter 260. In FIG. 11, components corresponding to similar components in FIG. 1 have been given the same numbers. With reference to FIG. 11, another form of adjustable steering column 10 is shown. As in the case of the FIG. 1 embodiment, desirably the steering column is adjustable upwardly and downwardly as indicated by arrows 12 to adjust the elevation of a steering wheel 19 mounted to a shaft 14 included in the assembly. Steering wheel 19 is shown schematically in this figure and is rotatable about an axis 15 to steer the vehicle as previously described. The shaft 14 may be coupled to steering components of a vehicle in any convenient manner, such as shown in FIG. 1. A housing 16 included in the steering column is raised and lowered with the elevation adjustment of the steering wheel. Thus, housing 16 constitutes a movable portion of the steering column assembly in this embodiment. A tilt mechanism which may include a tilt head 22 permits pivoting of the shaft 14 as indicated generally by arrows 32 to tilt the steering wheel in forward and aft directions relative to a driver of the vehicle. Again, adjustable and tiltable steering columns are available in numerous vehicles on the marketplace, such as trucks from Freightliner LLC.

In the embodiment shown in FIG. 11, a shift actuator support such as a bracket 150' may be fixed or otherwise mounted to the housing 16, for example by welding, bolts or otherwise. Bracket 150' thus moves upwardly and downwardly with the movement of the housing 16 in the direction of arrows 12. The illustrated bracket 150' includes a shift actuator coupling portion 152' and an outwardly projecting cable support portion such as a cable supporting arm 264. The arm 264 may be a separate element or of one piece homogeneous unitary integral construction with bracket section 152' as part of the bracket 150'. The arm 264 supports the shift cable 140. In the illustrated form, a cable supporting carrier 270 couples the cable to a distal end portion 268 of the arm 264.

The bracket section 152' supports a spherical bearing 170 (a multi-directional movement bearing structure may be used or multiple bearings may be used as equivalents). The bearing 170 is coupled to the shift actuator, in this case the rod 86. A lower end portion 272 of rod 86 is coupled to the crank 190 which in turn has its distal end portion 172 coupled to the cable 140. A bearing 274 may pivotally couple the cable to crank end 172. The bearing 274 may be a multi-directional structure such as a spherical bearing. Pivoting of rod 86 about its longitudinal axis pivots the crank 190 and shifts the cable 140 to thereby cause the transmission of the vehicle to shift. In this embodiment, the end of the cable supported at 270 moves upwardly and downwardly with the raising and lowering of the steering wheel.

In the embodiment of FIG. 11, the shift lever support 62 is also pivoted by pin or bearing 64 for pivoting movement about an axis 66 as indicated by arrows 68. The illustrated shift lever support 62 includes an upright portion 70 through which pin 64 extends and an outwardly projecting portion 72. In the embodiment of FIG. 11, the outwardly projecting portion 72 of shift lever support 62 comprises the shift gate. In this case, the elongated shift lever 80 is pivoted by a pin 96 to an upwardly projecting shaft section 98. Consequently, the shift lever is pivotal about an axis 101 in the direction indicated by arrows 102. The axis 101 may be perpendicular to the axis 66. In the FIG. 11 embodiment, the channel 100 comprises an opening extending through a shift lever actuator portion 94 of the shift lever 80. The opening 100 is enlarged and elongated in the direction of axis 66. The slot or channel 100 provides clearance to accommodate relative movement of the structure. Section 72 of this gate construction has a plurality of shift position detents or pin receiving openings, two of which are indicated at 280 in FIG. 11. A shift pin (not shown in FIG. 11) projects downwardly from the underside of shift lever portion 94. The pin registers with one of the openings 280 at each shift position of the transmission. To shift the transmission, the handle or shift lever 80 is pivoted about pin 96 so that the opening engaging pin at the underside of element 94 clears the opening 280 within which it is positioned. The lever 80 may then be pivoted to align the pin with another of the openings 280. The pin may be moved into such other opening (by lowering the lever) to complete the shifting of the vehicle.

The operation of a lever and pin opening engaging structure for establishing shift positions is readily understood from this description. Alternative shift position establishing mechanisms may be used such as are presently commercially available or which may become available in the future. A vibration dampening and biasing spring 282 may also be included in this construction.

Alternative pivot mechanisms may be utilized instead of pivot pin 96, such as a spherical bearing. Also, a single bearing structure accommodating the desired motions may be utilized instead of the combination of pivot pin 96 and pivot pin 64.

In this construction of FIG. 11, as the steering wheel 19 is raised or lowered, as in the case of FIG. 1, the rod 86 and bracket 150 are correspondingly raised and lowered. Consequently, the relative position of the steering wheel 19 and shift lever 80 is maintained. In addition, as the steering wheel is tilted toward or away from the driver, some movement of gate section 72, and more specifically of the shift lever support 62, takes place. In addition, movement of the shift lever 80 also occurs. Again, this assists in maintaining the relative position of the steering wheel and shift lever more constant even as the steering wheel is tilted.

These alternative forms of shift lever support mechanisms 62 and of shift actuator support mechanisms, such as bracket 150, illustrate the principle that variations in these components may be utilized while still providing the desired motion of the shift lever as the steering wheel elevation is changed and/or the steering wheel is tilted.

Figure 12:
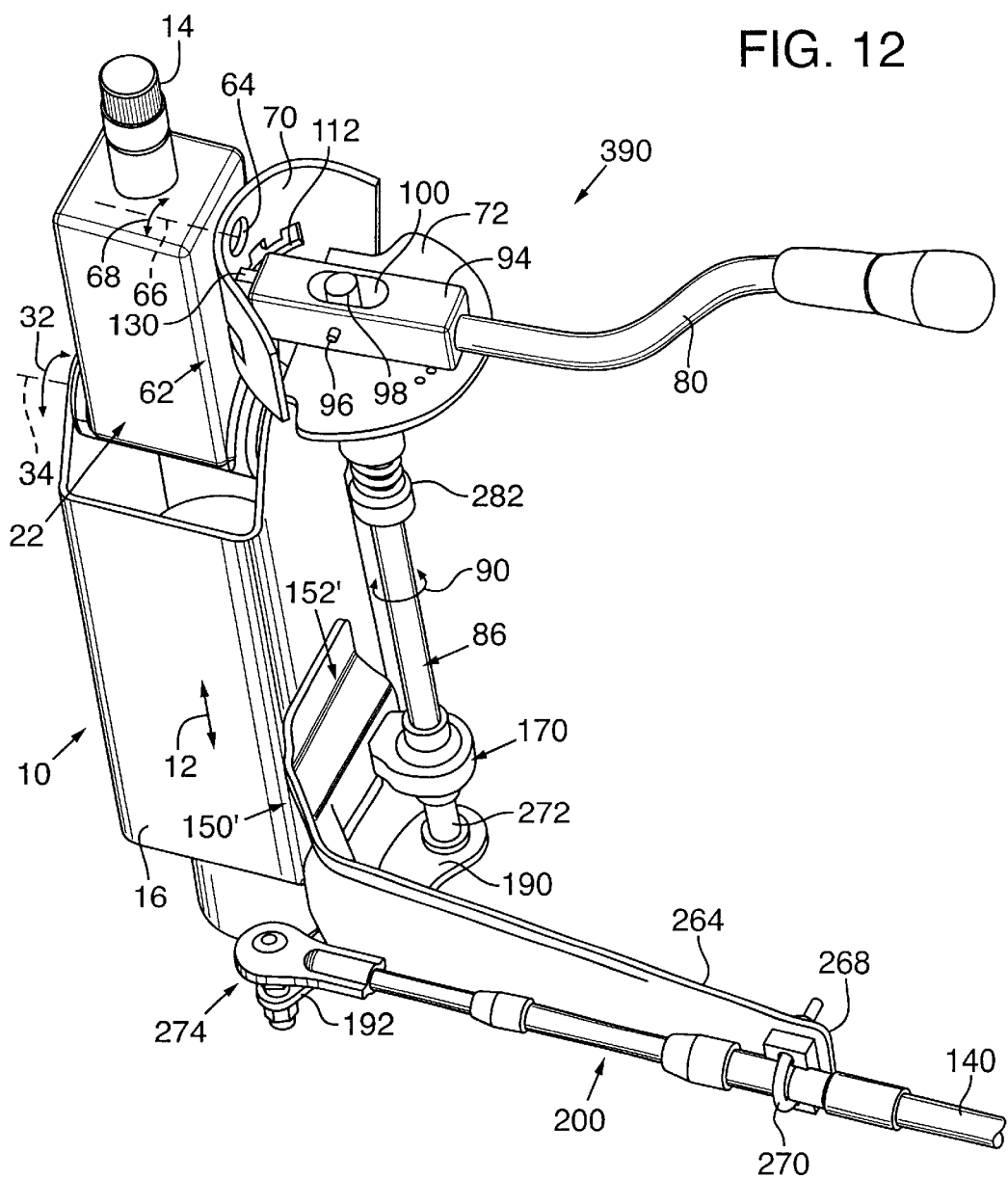
FIG. 12 is a perspective view of yet another form of vehicle shifter.

The FIG. 12 embodiment of a shift mechanism 390 utilizes a gate assembly similar to that of FIG. 1, although in this case the gate itself is pivoted to the tilt head 22 of the steering assembly. In addition, the shift actuator support mechanism 150' of FIG. 12 is like the mechanism of FIG. 11. As in the case of FIG. 11, numbers in FIG. 12 which correspond to portions of the previously described embodiments are the same. The operation of the FIG. 12 embodiment will be readily apparent from the previous description and hence will only be briefly described below.

In FIG. 12, like the FIG. 1 embodiment, the gate 70 is upright and is of an arcuate or curved construction. The slot 112 is provided in the gate 70. The shift position establishing projection 130 extends into the slot 112 from the shift actuator portion 94 of the shift lever 80. When projection 130 is in one of the voids or notches, the vehicle is in one shift position. To shift the vehicle, one lifts the handle or shift lever 80 upwardly such that the projection 130 pivots downwardly about the axis defined by the pin 96 to clear the void within which it was positioned. The lever is then moved forwardly or rearwardly (pivoted away from or toward the driver) generally in the plane of the upper surface of section 72. Projection 130 travels along the lower boundary of the slot to position the projection 130 in alignment with one of the other voids, corresponding to the desired shift position.

Again, various gate and shift position establishing mechanisms may be used. In addition, various forms of supports for carrying a shift lever and pivoting the shift lever to a tilt head may be used such that tilting of the tilt head causes the shift lever to be pivoted relative to the steering wheel as the steering wheel is tilted.

Figure 13:
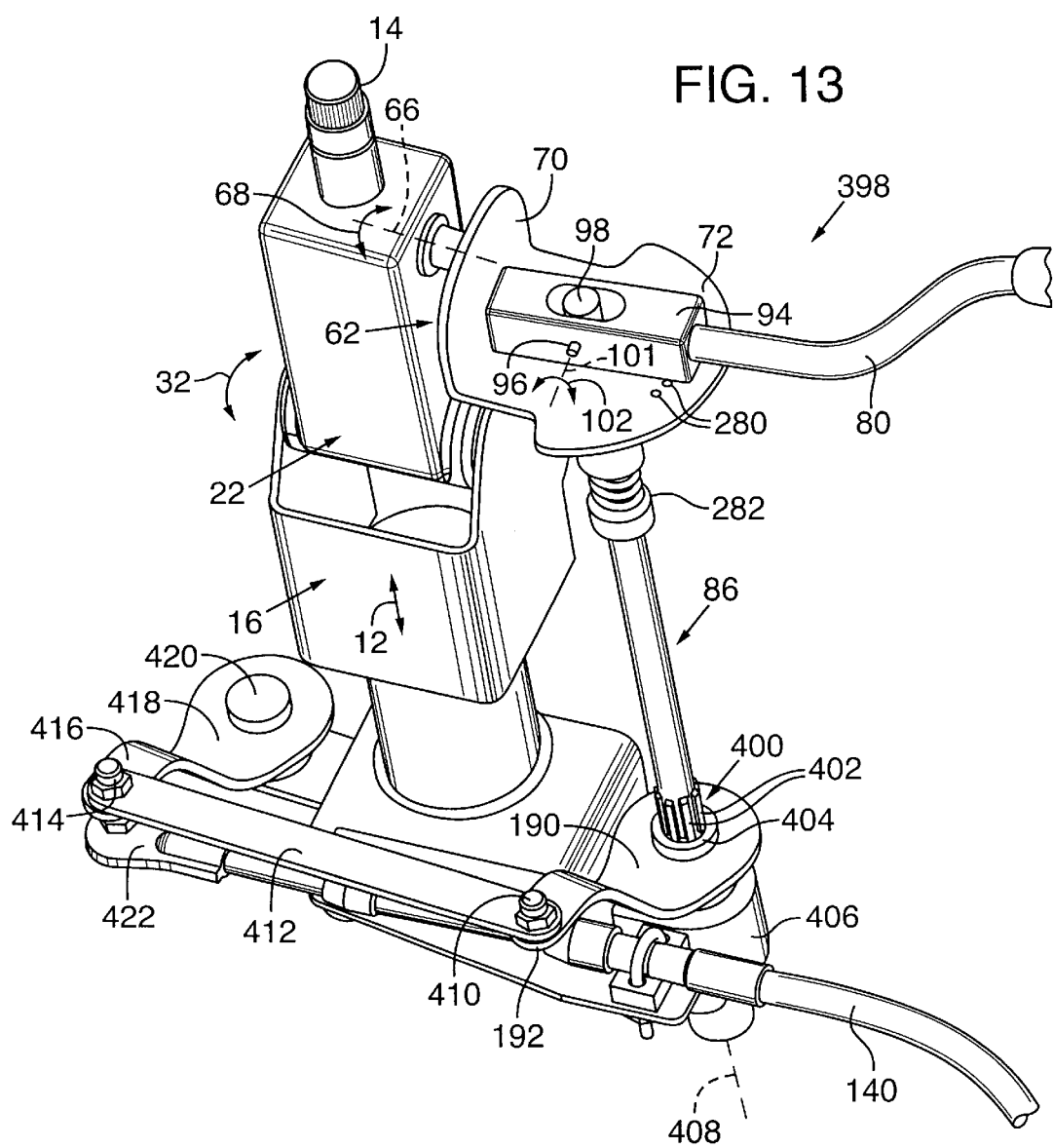
FIG. 13 is a perspective view of a further embodiment of a vehicle shifter.

The FIG. 13 form of shift mechanism 398 utilizes a gate structure which is similar to the FIG. 11 form. Again, numbers for corresponding portions which have been previously discussed are kept the same in FIG. 13.

In the FIG. 13 embodiment, the movable element 16 moves in the direction indicated by arrows 12 upwardly and downwardly as the steering wheel is raised and lowered. However, in the embodiment of FIG. 13, a different form of shift actuator support is utilized. More specifically, the lower end of the actuator rod is not carried by an actuator rod support which moves with the movement of the movable portion of the steering column. Instead, the actuator support is slidably coupled to the actuator rod. Various forms of slide coupling mechanisms may be used. In the illustrated embodiment, a splined coupler 400 is included in the lower portion of the actuator rod 86. The splined coupler 400 has a plurality of elongated splines, some of which are indicated at 402. These splines 402, in this example, extend in a lengthwise direction parallel to the longitudinal axis of the rod 86. The splines of splined coupler 400 are slidably received by a splined coupler receiver or collar 404 which is mounted to the crank 190. In the embodiment of FIG. 13, the crank is pivoted to a crank support 406 which forms a part of the shift actuator support structure in this embodiment. The crank pivots about an axis 408 which, in this example, is co-axial with the longitudinal axis of the shift rod 86. The splined coupler 400 and splined coupler receiver 404 permit axial sliding of the shaft 86 as the vehicle is raised and lowered. However, relative pivoting motion of the rod 86 and the crank 190 is prevented by the engagement between the splines and collar. Other constructions may of course be used which facilitate the sliding motion of the rod relative to the crank (if used) or other components of a shift actuator support. As the steering column and steering wheel is raised or lowered, a guide element, in this case the coupler receiver 404, restricts the movement of rod 86, except for upward and downward movement relative to the crank and thus relative to the shift cable 140. The cable 140, in this case, does not raise and lower and needs no clearance space to accommodate this motion. This splined coupler and splined coupler receiver thus comprises one form of slidably interfitting guide elements usable in a shift actuator support. In the embodiment of FIG. 13, the splines 402 are spaced equidistant around the circumference of the rod 86. The splined receiver 404 has an upwardly facing opening which is shaped to receive the splined end of the rod 86. The support 406 in this embodiment may carry the receiver 404 and thus the crank 190 and may include a spherical bearing or other bearing construction which permits the rod receiver to pivot about a first axis generally parallel to the axis 66 and a second axis generally parallel to the axis 102. The bearing or element 406 may be coupled to the vehicle framework.

The distal end 192 of crank 190 may be coupled directly to the cable or may be coupled to the cable in approaches such as indicated in FIGS. 1 or 12, or an alternative manner. However the approach shown in FIG. 13, the distal end 192 of crank 190 is coupled by a pivot pin 410 to one end portion of a link 412. The opposite end portion of the link 412 is coupled by a pivot pin 414 to the distal end 416 of a second crank 418. The second crank 418 is pivoted by a pin 420 to the vehicle. The cable 140 is coupled at 422, such as by a spherical bearing coupler, to the distal end 416 of the second crank 418. In this illustrated construction, the longitudinal axis of shift rod 86, the pivot axis of pivot 410, the pivot axis of pivot 414, and the pivot axis of pivot 420 are in a parallelogram arrangement. This adds stability to the construction. In this embodiment, the overall space required for the shift mechanism is confined more closely to the steering column than in the case where an elongated arm is used such as in FIG. 11.

As lever 80 is operated to shift the vehicle transmission, the rod 86 is pivoted by the lever. As a result, the crank 190 is pivoted. In addition, the crank 418 is pivoted via the link 412 to shift the position of the cable 140 and shift the transmission.

In general, various mechanisms may be used to provide a traveling shift lever which more closely travels with the movement of the steering column to thereby substantially maintain the relative position of the steering wheel and shift lever as the steering wheel position is changed in elevation and/or tilted. The invention is not limited to the specific embodiments described above. More specifically, the invention may be modified in arrangement and detail without departing from the principles which are apparent from the above disclosure. We claim all such modifications as fall within the scope and spirit of the following claims.

We claim:

1. A vehicle shifter for actuating a shift cable to cause a shifting of a vehicle transmission, the vehicle comprising a steering wheel tilt head which allows tilting of the steering wheel at least in fore and aft directions about a tilt pivot axis, the tilt head being carried at an upper portion of a steering column, the steering column being adjustable in length to raise or lower the elevation of the tilt head relative to the floor of the vehicle and thereby to respectively raise or lower the steering wheel, the vehicle shifter comprising:

a shift lever support pivotally coupled to the tilt head;

a shift lever carried by the shift lever support and movable relative to the shift lever support to a plurality of shift positions to cause shifting of the vehicle;

an elongated shift actuator having an upper portion coupled to the shift lever and a lower portion coupled to the shift cable such that movement of the shift lever from one shift position to another shift position moves the shift actuator and cable to shift the vehicle transmission; and a shift actuator support positioned below the shift lever support and coupled to the shift actuator so as to permit the lower portion of the shift actuator to move upwardly relative to the floor of the vehicle as the steering wheel is raised and to move downwardly relative to the floor of the vehicle as the steering wheel is lowered.

2. A vehicle shifter according to claim 1 in which the steering column includes a first movable section which is raised as the steering wheel is raised and lowered as the steering wheel is lowered, and wherein the shift actuator support is coupled to the first movable section for movement with the first movable section and wherein a lower portion of the shift actuator is coupled to the shift actuator support so as to move with the movement of the shift actuator support.

3. A vehicle shifter according to claim 2 comprising a spherical bearing coupling the shift actuator to the shift actuator support, the vehicle shifter also comprising at least one crank coupled to the shift cable and to the shift actuator such that movement of the shift lever from one shift position to another shift position pivots the shift actuator and also pivots the at least one crank to move the shift cable to shift the vehicle transmission.

4. A vehicle shifter according to claim 3 wherein the crank is positioned below the spherical bearing.

5. A vehicle shifter according to claim 1 in which the shift actuator is elongated and has a lower portion slidably coupled to the shift actuator support so as to slide upwardly relative to the shift actuator support as the steering wheel is raised and downwardly relative to the shift actuator support as the steering wheel is lowered.

6. A vehicle shifter according to claim 1 comprising at least one crank coupled to the shift cable and to the shift actuator such that movement of the shift lever from one shift position to another shift position pivots the shift actuator and also pivots the at least one crank to move the shift cable to shift the vehicle transmission, and wherein the shift actuator is slidable upwardly and downwardly relative to the crank as the steering column is respectively raised and lowered.

7. A vehicle shifter according to claim 6 in which the shift actuator comprises a rod having a longitudinal axis and a splined coupler at a lower portion of the rod, the splined coupler comprising a plurality of splines having a length which extends in a direction parallel to the longitudinal axis of the rod, and wherein the crank comprises a splined coupler receiver configured to slidably receive the splines of the splined coupler so as to permit upward and downward movement of the splined coupler and thereby the rod relative to the crank, the splined coupler receiver engaging the splined coupler to prevent relative rotation of the crank and the rod as the shift lever is pivoted.

8. A vehicle shifter according to claim 1 in which the steering column includes a first movable section which is raised as the steering wheel is raised and which is lowered as the steering wheel is lowered, the shift actuator support being coupled to the first movable section for movement with the first movable section;

the vehicle shifter comprising at least one crank coupled to the shift cable and to the shift actuator such that movement of the shift lever from one shift position to another shift position pivots the shift actuator and also pivots the at least one crank to move the shift cable and shift the vehicle transmission;

the vehicle shifter further comprising a projecting elongated cable support coupled to the first movable section of the steering column and extending outwardly of the steering column to a location spaced from the at least one crank, the shift cable being supported by the cable support at a location spaced from the crank, whereby raising and lowering the steering column respectively raises and lowers the cable support.

9. A vehicle shifter according to claim 8 in which the cable support comprises an arm which is included in the shift actuator support, the shift actuator comprising a shift rod having a lower end portion coupled to the crank, the shift actuator support also comprising a spherical bearing coupling a lower portion of the rod to the shift actuator support at a location above the crank to thereby couple the rod to the first movable section of the steering column.

10. A vehicle shifter according to claim 1 comprising a first crank coupled to the shift actuator, a second crank spaced from the first crank, a link member coupling the first crank to the second crank, and wherein the second crank is coupled to the shift cable, whereby movement of the shift lever from one shift position to another shift position pivots the shift actuator to pivot the first and second cranks to move the shift cable and shift the vehicle transmission.

11. A vehicle shifter according to claim 10 wherein the first and second cranks are positioned at opposite sides of the steering column from one another.

12. A vehicle shifter according to claim 11 wherein the shift actuator is slidably coupled to the first crank so as to permit upward movement of the shift actuator relative to the first crank with the upward movement of the steering wheel and downward movement of the shift actuator relative to the first crank upon downward movement of the steering wheel.

13. A vehicle shifter according to claim 1 including at least one crank coupled to the shift cable and to the shift actuator such that movement of the shift lever from one shift position to another shift position pivots the shift actuator and also pivots the at least one crank to move the shift cable to shift the vehicle transmission, the vehicle shifter comprising a slide guide and a slide positioned to slidably engage the slide guide, the crank being coupled to the slide, the cable also being coupled to the slide, whereby pivoting the crank slides the slide along the slide guide to thereby move the shift cable to shift the transmission.

14. A vehicle shifter according to claim 13 wherein the crank is positioned at one side of the steering column and at least a majority of the slide guide is positioned at the opposite side of the steering column from the crank.

15. A vehicle shifter according to claim 13 wherein the steering column includes a first movable section which is raised as the steering wheel is raised and lowered as the steering wheel is lowered, wherein the shift actuator support is coupled to the first movable section for upward and downward movement with the first movable section, and wherein the slide guide is also coupled to the first movable section.

16. A vehicle shifter according to claim 15 wherein the slide guide comprises a bracket and wherein the shift actuator support comprises a bracket which defines a slot, the slot comprising the slide guide.

17. A vehicle shifter for actuating a shift cable to cause the shifting of a vehicle transmission, the vehicle comprising a steering wheel tilt head which allows tilting of the steering wheel at least in fore and aft directions about a tilt pivot axis, the tilt head being carried at an upper portion of a steering column, the steering column being adjustable in length to raise or lower the elevation of the tilt head relative to the floor of the vehicle and to thereby respectively raise or lower the steering wheel, the vehicle shifter comprising:

a shift lever support pivotally coupled to the tilt head so as to pivot relative to the tilt head as the tilt head is pivoted;

a shift lever carried by the shift lever support and movable relative to the shift lever support to a plurality of shift positions to cause shifting of the vehicle;

an elongated shift actuator having an upper portion coupled to the shift lever and a lower portion coupled to the shift cable such that movement of the shift lever from one shift position to another shift position moves the shift actuator and cable to shift the vehicle transmission;

a shift actuator support positioned below the shift lever support and coupled to the shift actuator so as to permit the lower portion of the shift actuator to move upwardly relative to the floor of the vehicle as the vehicle steering wheel is raised and to move downwardly relative to the floor of the vehicle as the vehicle steering wheel is lowered;

the steering column comprising a first movable section which is raised as the steering wheel is raised and lowered as the steering wheel is lowered, the shift actuator support being coupled to the first movable section for upward and downward movement with the respective upward and downward movement of the first movable section;

a lower portion of the shift actuator being coupled to the shift actuator support;

at least one crank coupled to the shift cable and to the shift actuator such that movement of the shift lever from one shift position to another shift position pivots the shift actuator and also pivots the at least one crank to move the shift cable to shift the vehicle transmission;

a slide guide coupled to the first movable section of the steering column for upward and downward movement with the first movable section;

a slide disposed in the slide guide for sliding movement along the slide guide;

the crank being coupled to the slide and the shift cable also being coupled to the slide such that the crank is coupled to the shift cable through the slide;

the crank being operable to move the slide along the slide guide as the crank is pivoted to thereby move the shift cable and shift the transmission.

18. A vehicle shifter according to claim 17 comprising a link member coupling the crank to the slide.

19. A vehicle shifter according to claim 17 wherein the slide guide comprises a slot and the slide comprises a slide pin disposed for sliding within the slot.

20. A vehicle shifter according to claim 19 comprising a link member coupling the crank to the slide pin, a first spherical bearing coupling a lower portion of the shift actuator to the shift actuator support, the crank being positioned above the first spherical bearing, a second spherical bearing coupling the crank to the link and a third spherical bearing coupling the link to the slide pin.

21. A vehicle shifter according to claim 20 wherein the slide guide comprises a bracket which defines the slot, at least a major portion of the slot being positioned at the opposite side of the steering column from the crank.

22. A vehicle shifter according to claim 21 in which the slot defining bracket comprises a portion of the shift actuator support.

23. A vehicle shifter according to claim 22 wherein the shift actuator support comprises a first leg section having an upper end portion coupled to the first movable section of the steering column, an outwardly projecting platform section carrying the first spherical bearing, a downwardly projecting cable engaging section coupled to the cable at a location spaced from the slot, and an inwardly projecting slot defining section projecting in a direction away from the platform section.

24. A vehicle shifter according to claim 23 wherein the shift actuator support comprises a unitary one-piece monolithic bracket of a homogeneous material.

25. A vehicle shifter for actuating a shift cable to cause the shifting of a vehicle transmission, the vehicle comprising a steering wheel tilt head which allows tilting of the steering wheel at least in fore and aft directions about a tilt pivot axis, the tilt head being carried at an upper end portion of a steering column, the steering column being adjustable in length to raise or lower the elevation of the tilt head relative to the floor of the vehicle and thereby to raise and lower the steering wheel, the vehicle shifter comprising:

a shift lever support pivotally coupled to the tilt head at a location which is above the tilt pivot axis so as to be pivotal relative to the tilt head;

a shift lever carried by the shift lever support and movable relative to the shift lever support to a plurality of shift positions to cause shifting of the vehicle;

an elongated shift actuator having an upper end portion coupled to the shift lever and a lower end portion coupled to the shift cable such that movement of the shift lever from one shift position to another shift position moves the shift actuator and cable to shift the vehicle transmission; and a shift actuator support positioned below the shift lever support and coupled to the shift actuator so as to permit the lower end portion of the shift actuator to move upwardly relative to the floor of the vehicle as the steering wheel is raised and to move downwardly relative to the floor of the, vehicle as the steering wheel is lowered.

26. A vehicle shifter according to claim 25 in which the steering wheel is rotatable about a steering wheel axis and the shift lever support is pivotally coupled to the tilt head for pivoting about a shift lever support pivot axis which extends in a direction which is skewed relative to the steering wheel axis.

27. A vehicle shifter according to claim 25 in which the shift lever support pivot axis is substantially perpendicular to the steering wheel axis.

28. A vehicle shifter for actuating a shift cable to cause a shifting of a vehicle transmission, the vehicle comprising a steering wheel tilt head which allows tilting of the steering wheel at least in fore and aft directions about a tilt pivot axis, the tilt head being carried at an upper end portion of a steering column, the steering column being adjustable in length to raise or lower the elevation of the tilt head relative to the floor of the vehicle and thereby to raise or lower the steering wheel, the vehicle shifter comprising:

a shift lever;

shift lever support means for carrying the shift lever such that the shift lever pivots relative to the shift lever support, said shift lever support means also comprising means for pivoting to the tilt head of the vehicle such that the shift lever support means pivots about an axis which is spaced from the tilt pivot axis;

shift actuator means for coupling the shift lever to a shift cable for moving the shift cable in response to pivoting movement of the shift lever to thereby shift the vehicle transmission, the shift lever actuator means comprising an elongated rod coupled to the shift lever at one end portion and to the shift cable at the other end portion whereby the rod pivots with pivoting of the shift lever to shift the cable; and shift actuator support means for carrying the shift actuator means such that the shift actuator means moves upwardly relative to the floor of the vehicle as the steering wheel is raised and downwardly relative to the floor of the vehicle as the steering wheel is lowered.

29. A method of moving a vehicle shifter as the elevation of a steering wheel is raised or lowered and also as the steering wheel is tilted, the method comprising:

automatically pivoting the shifter relative to the steering wheel as the steering wheel is tilted; and raising the elevation of the shifter with the raising of the elevation of the steering wheel and lowering the elevation of the shifter with the lowering of the elevation of the steering wheel.

30. A method according to claim 29 wherein the act of pivoting the shifter comprises pivoting the shifter relative to the steering wheel as the steering wheel is tilted about an axis which is substantially perpendicular to the axis about which the steering wheel is pivoted as the steering wheel is used to steer the vehicle.

31. A method according to claim 29 in which the act of pivoting the shifter relative to the steering wheel as the steering wheel is tilted comprises pivoting the shifter relative to the steering wheel about a first pivot axis as the steering wheel is tilted about a second pivot axis which is spaced from the first pivot axis.

32. A method according to claim 31 in which the second axis about which the steering wheel tilts is below the first pivot axis about which the shifter pivots.

33. A method of moving a vehicle shifter as the elevation of a steering wheel is raised or lowered and also as the steering wheel is tilted, the method comprising:

pivoting the shifter relative to the steering wheel as the steering wheel is tilted; and raising the elevation of the shifter with the raising of the elevation of the steering wheel and lowering the elevation of the shifter with the lowering of the elevation of the steering wheel; and in which the act of pivoting the shifter comprises the act of pivoting the shifter about a pivot axis which is located above the pivot axis about which the steering wheel is tilted.

34. A vehicle shifter for actuating a shift cable to cause the shifting of a vehicle transmission, the vehicle comprising an elongated shift actuator which is pivoted by a shift lever to move the shift cable during shifting of the vehicle, the vehicle shifter comprising:

at least one crank coupled to the shift cable and to the shift actuator such that movement of the shift lever from one shift position to another shift position pivots the shift actuator and also pivots the at least one crank to move the shift cable to shift the vehicle transmission;

a slide guide;

a slide disposed in the slide guide for sliding movement along the slide guide;

the crank being coupled to the slide and the shift cable also being coupled to the slide such that the crank is coupled to the shift cable through the slide;

the crank being operable to move the slide along the slide guide as the crank is pivoted to thereby move the shift cable and shift the transmission.

35. A vehicle shifter according to claim 34 comprising a link member coupling the crank to the slide.

36. A vehicle shifter according to claim 34 wherein the slide guide comprises a slot and the slide comprises a slide pin disposed for sliding within the slot.

37. A vehicle shifter according to claim 36 wherein the slide guide comprises a bracket which defines the slot, at least a major portion of the slot being positioned at the opposite side of the steering column from the crank.

38. A vehicle shifter according to claim 37 wherein the bracket comprises a first leg section having an upper end portion coupled to the steering column of the vehicle, an outwardly projecting platform section coupled to the shift actuator, a downwardly projecting cable engaging section coupled to the cable at a location spaced from the slot, and an inwardly projecting slot defining section projecting in a direction away from the platform section.

39. A vehicle shifter according to claim 38 wherein the bracket comprises a unitary one-piece monolithic bracket of a homogeneous material.

* * * * *

UNITED STATES PATENT AND TRADEMARK OFFICE
CERTIFICATE OF CORRECTION

PATENT NO.    : 6,647,822 B2
DATED         : November 18, 2003
INVENTOR(S)   : Ritchie et al.

It is certified that error appears in the above-identified patent and that said Letters Patent is hereby corrected as shown below:

Column 16,
Line 30, reads "the, vehicle" should read -- the vehicle --.

Signed and Sealed this

Twenty-ninth Day of June, 2004

JON W. DUDAS
*Acting Director of the United States Patent and Trademark Office*